United States Patent [19]
Rademaker

[11] Patent Number: 6,134,323
[45] Date of Patent: Oct. 17, 2000

[54] TELECOMMUNICATIONS SYSTEM, AN AUTOMATIC BRANCH EXCHANGE, A LINE CARD, A SUPPLY CIRCUIT FOR A TELECOMMUNICATIONS LINE, AND A TELECOMMUNICATIONS SUBSCRIBER DEVICE

[75] Inventor: Gerrit Rademaker, Soest, Netherlands

[73] Assignee: U.S. Philips Corporation, New York, N.Y.

[21] Appl. No.: 08/919,973

[22] Filed: Aug. 28, 1997

[30] Foreign Application Priority Data

Sep. 3, 1996 [EP] European Pat. Off. .............. 96202454

[51] Int. Cl.$^7$ .................................................. H04M 19/00
[52] U.S. Cl. .......................... 379/413; 379/324; 379/399
[58] Field of Search ..................................... 379/413, 412, 379/400, 401, 405, 399, 324, 398; 307/490; 327/358; 323/224

[56] References Cited

U.S. PATENT DOCUMENTS

| | | | |
|---|---|---|---|
| 4,046,968 | 9/1977 | Embree et al. ........................... | 379/413 |
| 4,167,654 | 9/1979 | Bolus et al. .............................. | 379/412 |
| 4,181,824 | 1/1980 | Seidel ...................................... | 379/398 |
| 4,314,106 | 2/1982 | Bakker ..................................... | 379/400 |
| 4,554,412 | 11/1985 | Smith ...................................... | 379/413 |
| 4,767,980 | 8/1988 | Chen et al. .............................. | 379/413 |
| 4,961,222 | 10/1990 | Johansson et al. ..................... | 379/413 |
| 5,003,588 | 3/1991 | Wingerath ............................... | 379/412 |
| 5,274,702 | 12/1993 | Rosch et al. ............................ | 379/401 |
| 5,333,196 | 7/1994 | Jakab ....................................... | 379/412 |
| 5,359,655 | 10/1994 | Rademaker et al. .................... | 379/401 |
| 5,692,041 | 11/1997 | Torazzina ................................ | 379/379 |
| 5,737,411 | 4/1998 | Apfel ....................................... | 379/413 |
| 5,867,557 | 4/1998 | D'Andrea et al. ....................... | 379/29 |

FOREIGN PATENT DOCUMENTS

| | | |
|---|---|---|
| 1007208A3 | 4/1995 | Belgium . |
| 7344124 | 7/1975 | France . |

*Primary Examiner*—Forester W. Isen
*Assistant Examiner*—Jacques Saint-Surin

[57] ABSTRACT

A telecommunication system has a supply circuit to supply power to a telecommunication line. The telecommunication line is connected to a telecommunications subscriber device. The supply circuit has a first electronic impedance that is connected between a first voltage reference terminal and a first wire of the line, and a second electronic impedance that is connected between a second voltage reference terminal and a second wire of the line. The first electronic impedance has a first transistor, and the second electronic impedance has a second transistor. The supply circuit further has a first impedance multiplying circuit with a third transistor, and a second impedance multiplying circuit with a fourth transistor. The first impedance multiplying circuit multiplies the impedance of the first electronic impedance, and the second impedance multiplying circuit multiplies the impedance of the second electronic impedance. In a current path between the first voltage reference terminal and the second voltage reference terminal, main current paths of the first and third transistors, and of the second and fourth transistors are connected in respective series arrangements.

13 Claims, 4 Drawing Sheets

TELECOMMUNICATIONS SYSTEM, AN AUTOMATIC BRANCH EXCHANGE, A LINE CARD, A SUPPLY CIRCUIT FOR A TELECOMMUNICATIONS LINE, AND A TELECOMMUNICATIONS SUBSCRIBER DEVICE

BACKGROUND OF THE INVENTION

The present invention relates to a telecommunications system comprising a supply circuit for a telecommunications line comprising a first and a second wire, which supply circuit comprises a first electronic impedance circuit including a first transistor and a second electronic impedance circuit including a second transistor, the electronic impedance circuits being coupled between a first voltage reference terminal and the first wire and between a second voltage reference terminal and the second wire, respectively. Such a system can be a private automatic branch exchange coupled to a number of subscriber sets via twisted pairs, whereby the sets can be analog or digital sets and whereby the branch exchange can be coupled to the public switched telephone network, or any other suitable system wherein subscriber sets have to be fed via the telecommunications line.

The present invention further relates to an automatic branch exchange, a line card, a supply circuit for a telecommunications line, and a telecommunications subscriber device.

A telecommunications system of the above kind is known from the Belgium Patent No. 1007208A3, filed by the same applicant. This Belgium Patent discloses a telecommunications system comprising a supply circuit for feeding power to a twisted pair telecommunications line to another end of which a telecommunications subscriber device such as a telephone device or a facsimile apparatus or a data terminal, or the like, can be coupled. The telecommunications device is fed via a DC-voltage injected into the twisted pair by means of the supply circuit. The known supply circuit applies line voltage control so that the DC-line current is dependent on the supply needs of the subscriber device. Herewith, power is not unnecessarily dissipated by the supply circuit as would be the case with current control and varying telecommunications line lengths. In the latter case, the supply circuit would have to be designed for a maximum line length and power would be wasted when applying a shorter line length. In order to inject DC-power to the telecommunications line and at the same time to avoid that signal power is fed from the wired to the DC-supply, the known circuit applies electronic impedances symmetrically arranged between the wires and respective DC-power supply lines. The electronic impedances simulate large coils. This is because in modern branch exchanges, or the like, large coils should be avoided. Such coils are expensive and are bulky so that mounting is cumbersome. The electronic impedances comprise a FET (Field Effect Transistor) of which a control electrode is coupled to a DC-supply terminal and a wire via a junction of a series arrangement of a resistor and a capacitor, and further a resistor in the source lead of the FET. Due to the series arrangement of the resistor and the capacitor the gate voltage of the FET can only vary slowly so that a virtually constant voltage occurs across the source resistor of the FET. An AC-voltage at the drain of the FET is attenuated by a factor inversely proportional to the gain of the FET. As a result, the electronic impedance behaves like a lump element coil, the equivalent impedance being equal to the value of the source resistor of the FET multiplied by the gain-factor of the FET, and the DC-resistance virtually being equal to the value of the source resistor. The resistor in the series arrangement preferably has a relatively high value, this resistor being connected parallel to the emulated coil. In order to create an optimal dynamic operating range for the FET and in order to avoid signal distortion and demodulation of strong amplitude modulated disturbance signals such as signals from strong AM-broadcasting transmitters, a diode-resistor series arrangement is provided between the control electrode of the FET and a DC-supply terminal or a wire, as the case may be. Although this electronic impedance circuit operates satisfactorily for relatively low line currents, problems arise when relatively high line currents are needed. Such relatively high DC-line currents, in the order of 200 mA, for instance, are needed when applying multifunctional telecommunications subscriber devices that can include a switched mode power supply for feeding internal circuitry and for feeding external devices. At the other end of the line the line voltage should be relatively low. When applying switched mode power supplies that require a constant power, the line current increases if the line voltage decreases. Furthermore, at the side of the branch exchange, the line voltage typically is −48 Volts but in case of a mains interruption, when accumulators are used, such line voltage could drop to −42 Volts. Under the above circumstances it is important that the voltage losses across the electronic circuits that replace lump element coils are as small as possible. The known circuit comprises a resistor that is coupled between a source electrode and a wire or a DC-supply terminal, as the case may be.

This resistor should be large enough so as to achieve that the impedance of the electronic circuit is as large as possible and small enough so as not to cause a too large voltage drop. When relatively large line currents are requested such a compromise is difficult to achieve without unsatisfactorily system operation.

The French Patent Application No. 2 254 168 discloses a supply circuit for a telecommunications line comprising a Darlington transistor pair instead of a FET. The Darling pair, connected as an electronic impedance, has different electronic properties than a single FET, and has a higher amplification factor. Such a Darlington configuration could be applied for switching on/off relatively high currents but the Darlington pair would not perform well for linear applications or for putting digital data on the line having a relatively high frequency, such as in the order of 40–200 kHz. This is because a Darlington is a current to current amplifier in which a main current is built up quickly after applying a control current to the Darlington, but this main current decreases very slowly if it is being switched off. I.e., the Darlington quickly opens (high gain) but slowly closes. Due to the high loop gain, the Darlington pair will easily become instable, i.e., the circuit will tend to oscillate or exhibit a phenomenon called 'motorboating'.

OBJECTS AND SUMMARY OF THE INVENTION

It is an object of the present invention to provide a telecommunications system of the above kind that has a good performance for relatively high DC line currents.

To this end the telecommunications system according to the present invention is characterized in that the supply circuit comprises a first electronic impedance multiplying circuit including a third transistor and a second electronic impedance multiplying circuit including a fourth transistor, a main current path of the first transistor being coupled in a series arrangement with a main current path of the third transistor between the first reference voltage terminal and the first wire and a main current path of the second transistor being coupled in a series arrangement with a main current path of the fourth transistor between the second reference voltage terminal and the second wire. Herewith, impedance multiplication is done in a controlled way, namely in a least two separate stages, while at the same time a relatively low DC voltage drop is achieved across the multiplied electronic impedance. The AC-impedance can advantageously be increased by connecting more than two electronic impedance multiplying circuits in a cascode arrangement.

In an embodiment of a telecommunications system according to the present invention, the supply circuit comprises at least a reverse biased diode or a series arrangement of the reverse biased diode and a resistor coupled between a control electrode of at least one transistor of the electronic impedance circuit or the electronic impedance multiplying circuit and one of the voltage reference terminals or one of the wires, respectively. Herewith, the AM-modulated disturbance signals such as strong radio channels which would otherwise become audible can be suppressed effectively. The bias voltage of the transistors can be made small. If the diode detects an AM-disturbance signal, the signal control swing of the transistors become larger dynamically.

In another embodiment of a telecommunications system according to the present invention, a main electrode of the first and/or the second transistor is coupled to the first voltage reference terminal and/or to the second wire, respectively, via a series arrangement of at least one forward biased diode and a resistor. Herewith, the DC voltage swing of the multiplied electronic impedance is decreased by at least one forward diode voltage so that power dissipation is reduced.

In another embodiment of a telecommunications system according to the present invention, a main electrode of the third and/or the fourth transistor is coupled to the first voltage reference terminal and/or to the second wire, respectively, and wherein a control electrode of the third and/or the fourth transistor is coupled to the main electrode via a series arrangement of a first resistor, a first forward biased diode, and a second forward biased diode, and a junction of the first resistor and the first diode is coupled to a third voltage reference terminal via a second resistor. Herewith, the DC voltage swing of the multiplied electronic impedance is considerably decreased so that power dissipation is decreased. Then, a smaller transistor can be applied and thus a smaller heatsink or no heatsink at all.

In another embodiment of a telecommunications system according to the present invention, the first electronic impedance circuit and/or the second electronic impedance circuit comprise a control loop for controlling the voltage between main electrodes of the first and/or second transistor to a predetermined voltage value. Herewith, a DC voltage between the main electrodes of the transistor of the electronic impedance circuit can be controlled to have the smallest possible value for achieving a proper operation for a given main electrode path resistance so that this transistor advantageously can be a small one. By using a control loop instead of applying compensation, as in the previous embodiments, it is achieved that said DC voltage is controlled to the same low voltage under all operational circumstances and/or the tolerances of the gate-source voltages of the FETs.

BRIEF DESCRIPTION OF THE DRAWINGS

The present invention will now be described, by way of example, with reference to the accompanying drawings, wherein FIG. 1 schematically shows a telecommunications system according to the present invention.

Throughout the figures the same reference numerals are used for the same features.

DETAILED DESCRIPTION OF THE PREFERRED EMBODIMENT

Figure 1:
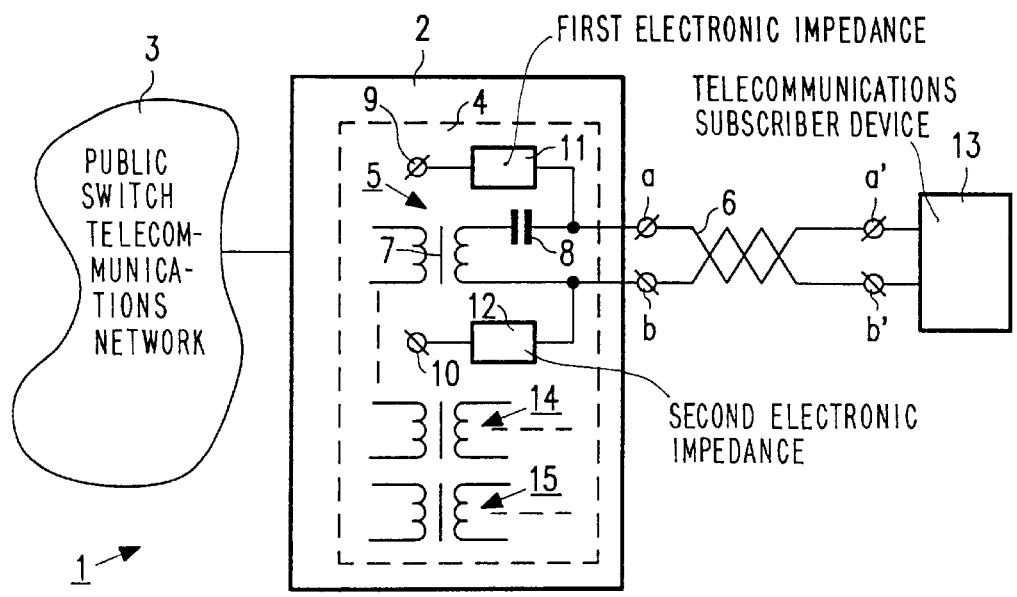

FIG. 1 schematically shows a telecommunications system 1 according to the present invention comprising an automatic branch exchange 2 which can be coupled to a public switched telecommunications network 3. The automatic branch exchange 2 comprises a number of line cards, a line card 4 being shown. Typically, a line card comprises a number of supply circuits for telecommunications lines. A supply circuit 5 is shown for supplying DC power to a telecommunications line 6, typically a twisted pair comprising a first wire a and a second wire b. The supply circuit 5 injects DC power into the line 6 to which further a useful signal such as a voice and/or data signal is injected via a transformer 7. A DC-blocking capacitor 8 is provided so as to avoid that the DC supply voltage is short-circuited by the transformer 7. The supply circuit comprises voltage generation means (not shown in detail) for generating a line voltage between a first voltage reference terminal 9 and a second voltage reference terminal 10, typically a voltage of −48 Volts. The supply circuit 5 comprises a first electronic impedance circuit 11 and a second electronic impedance circuit 12 emulating lump element coils, i.e., the electronic impedances have a high impedance for signals to be transmitted and received via the telecommunications line 6 so as to avoid that signals do not flow into the DC supply lines, and the electronic impedances have a low impedance for DC signals so that DC power losses are as small as possible. The supply circuit 5 is arranged such that DC voltage control of the telecommunications line 6 is achieved. Then, the line current is determined by the current required by a telecommunications subscriber device 13 coupled to the other end of the telecommunications line 6 via terminals a' and b', and furthermore, power losses in the line 6 are as small as possible. The line card 6 comprises other supply circuits, schematically indicated by further transformers 14 en 15 and dashed lines.

Figure 2:
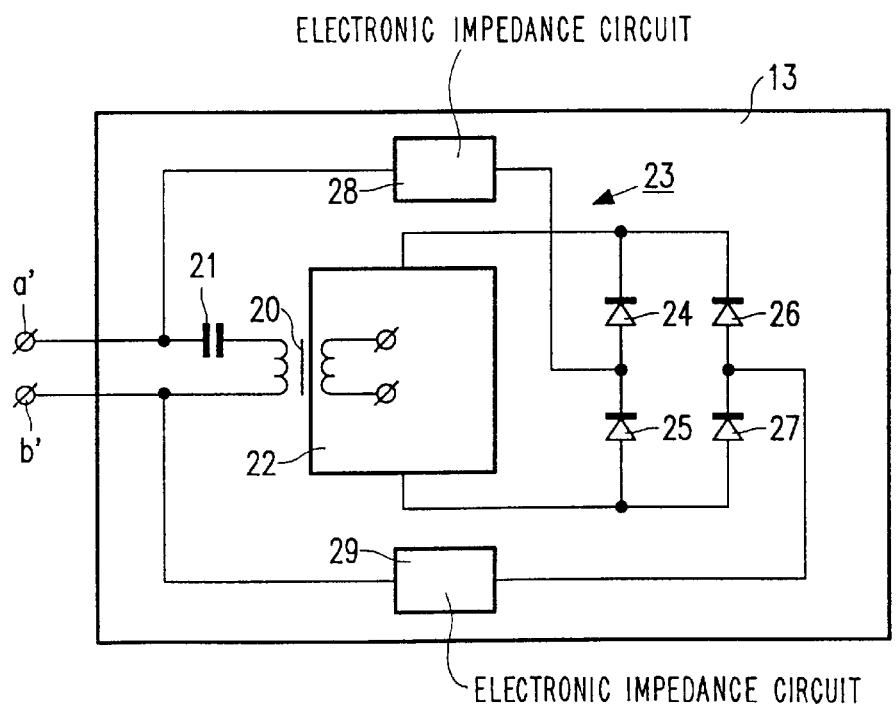
FIG. 2 shows a blockdiagram of a telecommunications subscriber device according to the present invention.

FIG. 2 shows a blockdiagram of the telecommunications subscriber device 13 according to the present invention comprising a transformer 20 coupled to the terminals a' and b' of the telecommunications line 6 via a DC blocking capacitor 21. Via the transformer 20, signals to and from the telecommunications line 6 are exchanged with further circuitry and facilities 22 of the subscriber device 13, in a well-known way. The subscriber device 13 further comprises a supply circuit 23 for supplying DC power from the telecommunications line to the further circuitry and facilities 22. The supply circuit 23 comprises a diode bridge formed by diodes 24, 25, 26, and 27 and electronic impedance circuits 28 and 29 emulating lump element coils. At one end, the electronic impedance circuits 28 and 29 are coupled to the terminals a' and b', respectively, and at an other end to the diode bridge. Although it is preferable that both electronic impedance circuits 28 and 29 are present so as to obtain that common mode disturbance signals on the telecommunications line do not become audible, under certain circumstances one of the electronic impedance circuits could be replaced by a short-circuit.

Figure 3:
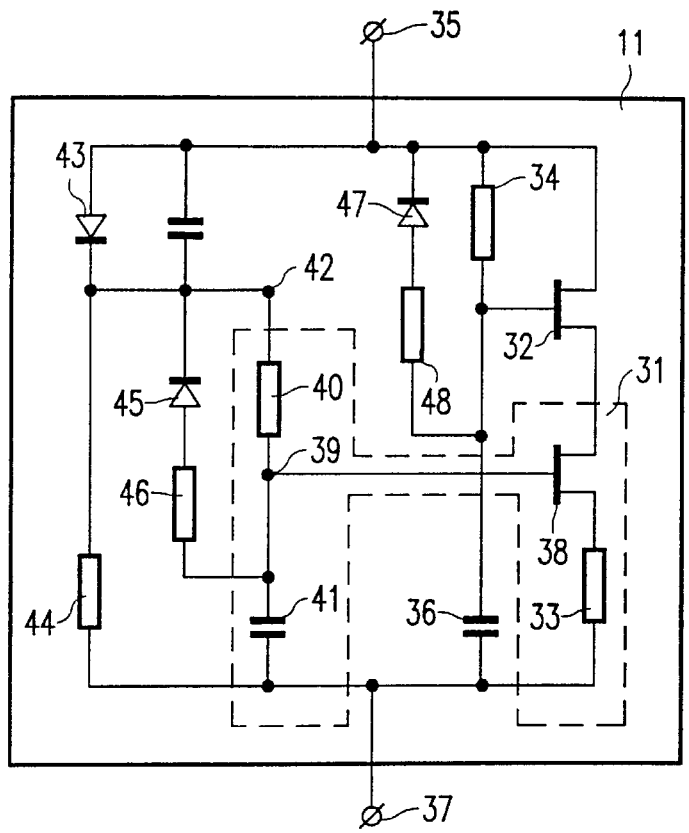
FIG. 3 shows an embodiment of an electronic impedance circuit according to the present invention used in a supply circuit for a telecommunications line.

FIG. 3 shows an embodiment of the electronic impedance circuit 11 according to the present invention used in the supply circuit 5 for the telecommunications line 6. The electronic impedance circuits 12, 28, and 29 are similar in construction. The electronic impedance circuit 11 comprises a transistor 32 having a resistor 33 in its main current path. A resistor 34 is coupled between a terminal 35 of the electronic impedance circuit 11 and a control electrode of the transistor 32 and a capacitor 36 is coupled between the control electrode of the transistor 32 and a terminal 37 of the electronic impedance circuit 11. The electronic impedance circuit 11 further comprises a transistor 38 of which a main current path is coupled in a series arrangement with a main current path of the transistor 32, and of which a control electrode is coupled to a junction 39 of a series arrangement of a resistor 40 and a capacitor 41. According to the present invention, a first electronic impedance circuit 31 is formed by the transistor 38, the resistors 33 and 40, and the capacitor 41, and an electronic impedance multiplying circuit is formed by the transistor 32, the resistor 34, and the capacitor 36. If the electronic impedance circuit 11 only comprises the basic electronic impedance circuit 31, a value of the resistor 33 would have to be chosen such high that the AC impedance of the circuit would become high enough and such low that the DC voltage drop across the electronic impedance 11 would not be too high, i.e., such a choice would be a compromise. Particulary with relatively high line currents, e.g. in the order of 200 mA, such a compromise is difficult to achieve. At an opposite end of the junction 39, the resistor 40 is coupled to a junction 42 and the capacitor 41 is coupled to the terminal 37. For a proper functioning of the electronic impedance 11, a given reference voltage should be supplied to the junction 42. In the embodiment given, a voltage of one forward biased diode below a voltage on the terminal 35 is fed to the junction 42. This is done by coupling a forward biased diode 43 between the terminal 35 and the junction 42, the diode being biased by the resistor 44. The junction 42 may also be connected to the main path of the transistors 32 and 38, to a junction between the transistors 32 and 38. By use of impedance multiplication in controlled way, power losses in the electronic impedance circuit 11 are greatly reduced as compared to the basic electronic impedance circuit 31 without the risk of instability that occurs when using a Darling pair. The resistor value of the resistor 33 can be much lower than in a basic electronic impedance. The component values of the components in the control circuits of the transistors 32 and 38 are chosen such that the voltage swing across the main electrodes of the transistor 32 is sufficient for dynamic behaviour and that the voltage swing across the main electrodes of the transistor 38 is as low as possible, virtually no signal being present on the main electrodes of the transistor 38. As compared to a typical power loss of 2W in a basic electronic impedance in which the resistor 33 has a value of 40 Ohms and the transistor DC voltage swing is 2 Volts and a current of 200 mA, the power loss in the circuit according to the present invention is greatly reduced. One factor achieving this reduction is that the value of the resistor 33 can be chosen much smaller, typically in the order of 1 Ohm. Depending on the embodiment, the power loss is reduced to a value between 0.3W and 0.8W for a current of 200 mA. Furthermore, the electronic impedance circuit 11 may comprise series arrangements of a reverse biased diode and a resistor so as to better suppress common mode amplitude modulated disturbance signals. In the embodiment given, series arrangements of a diode 45 and a resistor 46 and of a diode 47 and a resistor 48 are coupled across the resistors 40 and 34, respectively. The transistors 32 and 38 may by bipolar transistors or Field Effect Transistors. With a combination of a Field Effect Transistor and a bipolar transistor, the transistor 32 preferably is a Field Effect Transistor.

Figure 4:
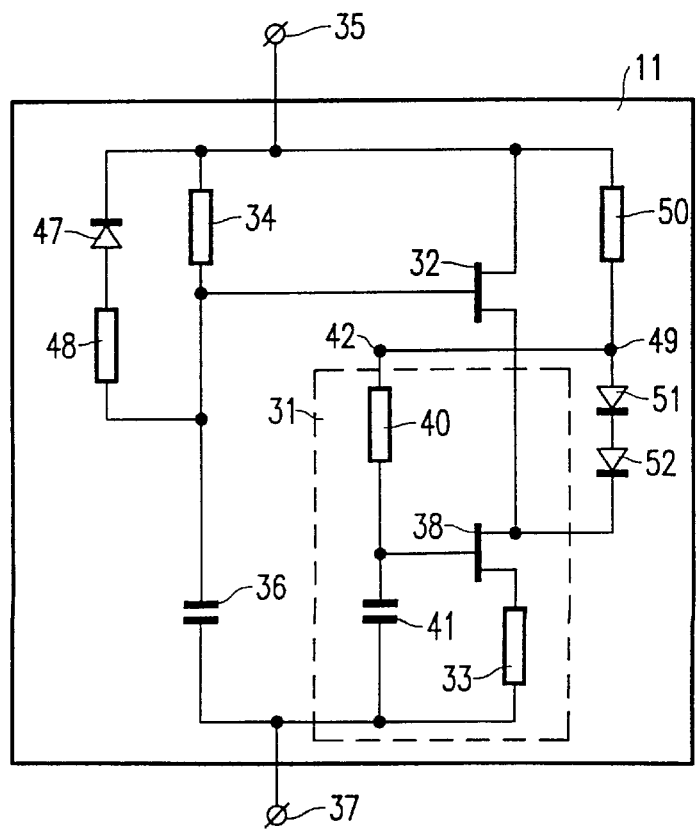
FIG. 4 shows another embodiment of an electronic impedance circuit according to the present invention.

FIG. 4 shows another embodiment of the electronic impedance circuit 11 according to the present invention, the junction 42 is coupled to a junction 49 of a resistor 50 which is coupled with its other end to the terminal 35 and to a series arrangement of at least one forward biased diode 51 which is coupled with its other end to a junction of main electrodes of the transistors 32 and 38. Shown is a further diode 52. As compared to the embodiment in which the junction 42 is directly coupled to this main electrode junction, the voltage across the main electrodes of the transistor 38 is typically reduced with 1.2 Volts if Silicium diodes are used.

Figure 5:
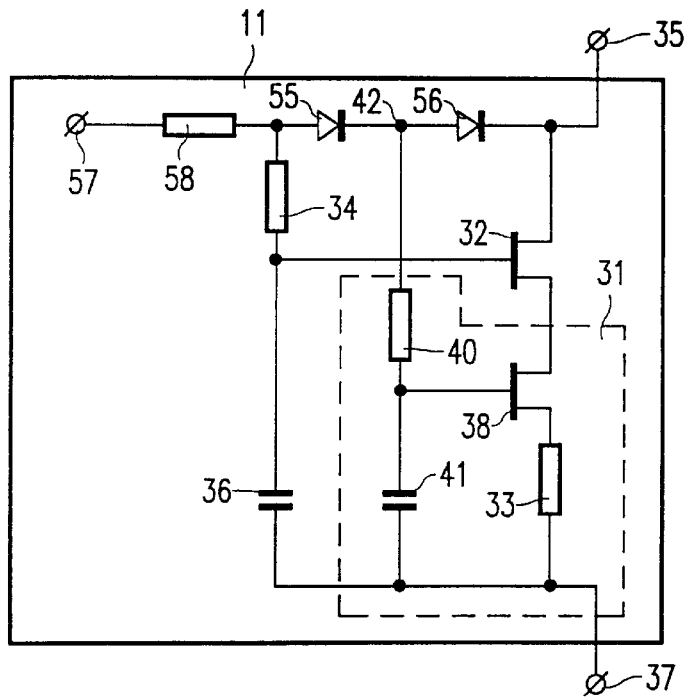
FIG. 5 shows another embodiment of an electronic impedance circuit according to the present invention.

FIG. 5 shows another embodiment of the electronic impedance circuit 11 according to the present invention. In this embodiment, the junction 42 is a junction between two forward biased diodes 55 and 56, the diode 56 being coupled with its other end to the terminal 35 and the diode 55 being coupled with its other end to a reference terminal 57 via a resistor 58. The reference potential at the terminal 57 is greater than the reference terminal at the terminal 35. If the transistors 32 and 38 are Field Effect Transistors both having a gate-source-voltage of 2 Volts, for instance, in the embodiment given such relatively large gate-source voltages are partly compensated. The resistors 34 and 40 have a relatively great value so that, if the terminal 35 has ground potential, the gate of the transistor 32 has a voltage of 1.2 Volts and the gate of the transistor 38 has a voltage of 0.6 Volts. In the example given, assuming that the resistor 33 has a value of 1 Ohm and a current of 200 mA, the dissipated power is typically reduced from 2 W to 0.3 W as compared to a basic electronic impedance circuit.

Figure 6:
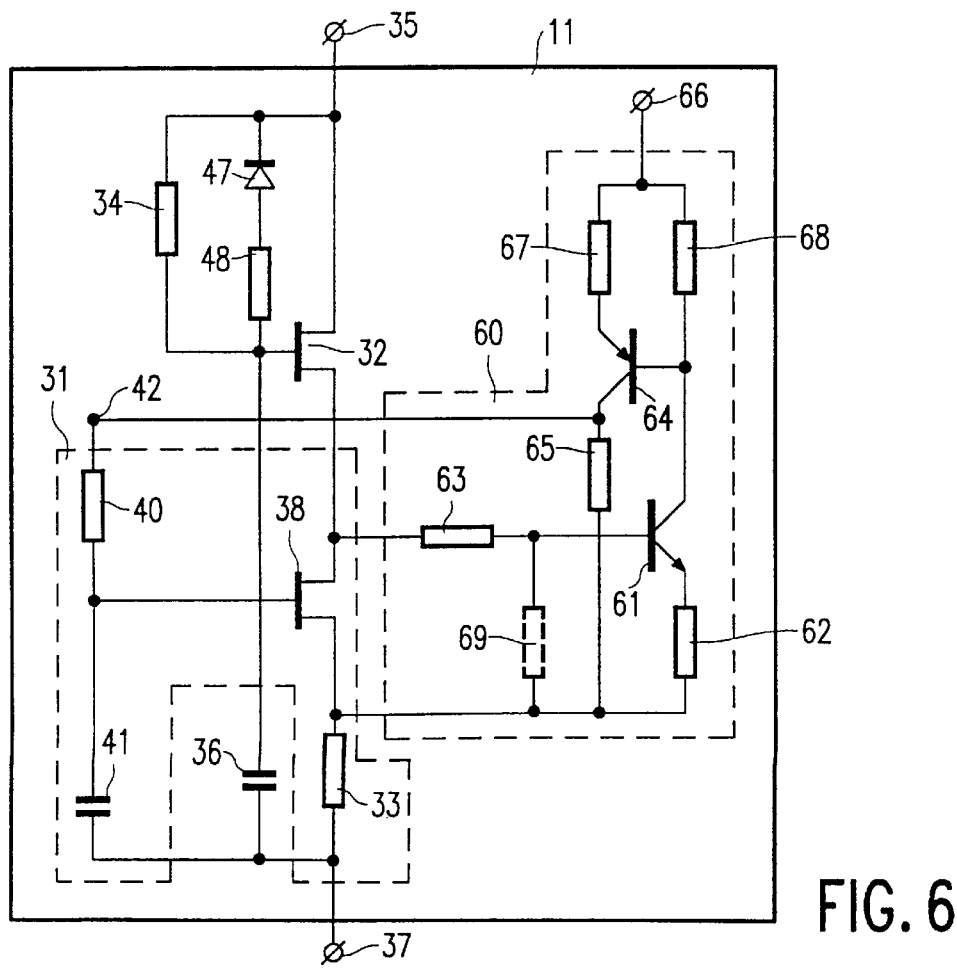
FIG. 6 shows another embodiment of an electronic impedance circuit according to the present invention.

FIG. 6 shows another embodiment of the electronic impedance circuit 11 according to the present invention. This embodiment differs from the above embodiments in that in the embodiments above compensation methods where applied for adjusting the voltage across the main electrodes of the transistor 38. In the embodiment given closed loop control is applied for such an adjustment advantageously giving an accurate and desired adjustment of said voltage regardless varying parameters. The electronic impedance circuit comprises a control loop for controlling said voltage by means of a control circuit 60. The control circuit 60 comprises a first bipolar control transistor 61 of which the emitter is coupled to the source of the transistor 38 via a resistor 62 and of which the base is coupled to the drain of the transistor 38 via a resistor 63. The collector of the transistor 61 is coupled to the base of a second control transistor 64. The collector of the transistor 64 is coupled to the source of the transistor 38 via a resistor 65 and to the junction 42. The emitter of the transistor 64 is coupled to a terminal 66 via a resistor 67. The base of the transistor 64 is coupled to the terminal 66 via a resistor 68. Herewith, the Field Effect Transistor can be controlled to have a low voltage across its main electrodes and thus can be small because of reduced dissipation. Operation is as follows. If the drain-source voltage of the transistor 38 gets above the base-emitter voltage of the transistor 61, which is 0.6 Volts for a Silicium transistor, the transistor 61 becomes conductive. The current then flowing through the transistor 61 causes the transistor 64 to become conductive. The control loop is closed due to the fact that the collector of the transistor 64 is connected to the junction 42. Herewith, the drain-source voltage across the Field Effect Transistor is controlled to a value equal to the base-emitter voltage of the transistor plus a small value in the order of some tenth of a volt, the small value being dependent on the loop gain. For stability reasons, the loop gain is kept relatively low. By coupling a resistor 69 between the base of the transistor 61 and the source of the transistor 38, the drain-source voltage can even be made greater, namely 0.6 Volts plus a fraction equal to the quotient of the values of the resistors 63 and 69 times 0.6 Volts. Instead of the two resistors 63 and 69 a potentiometer (not shown in detail) can be applied of which the slider is coupled to the base of the transistor 61 and that further coupled between the drain and the source of the transistor 38. Herewith, the drain-source voltage of the transistor can be easily adjusted to any desired value between 0.6 Volts and a higher voltage.

Figure 7:
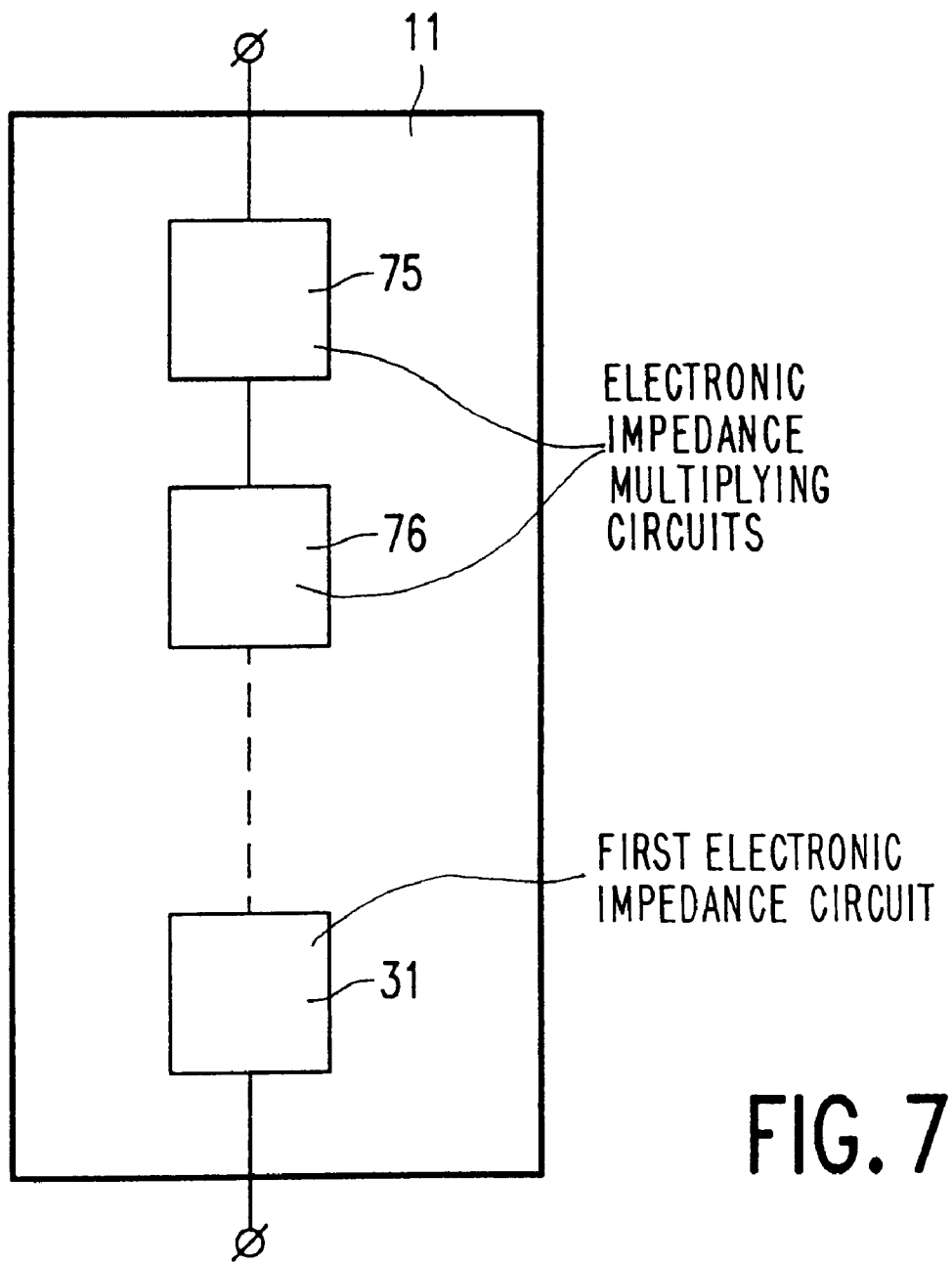
FIG. 7 shows a cascode arrangement of at least two electronic impedance multiplying circuits in a supply circuit according to the present invention.

FIG. 7 shows a cascode arrangement of at least two electronic impedance multiplying circuits 75 and 76 in a supply circuit according to the present invention in the electronic impedance circuit 11. The multiplying circuits 75 and 76 are similar in construction as the ones described. Herewith, the AC impedance can be greatly increased without the risk of the circuit becoming instable. This is due to the fact that there are no loop gains exceeding the gain of a single stage while at the same time the impedance multiplication factor increases with the addition of further multiplication stages.

What is claimed is:

1. A telecommunications system comprising a supply circuit for a telecommunications line comprising a first and a second wire, said supply circuit comprising a first electronic impedance circuit including a first transistor and a second electronic impedance circuit including a second transistor, the electronic impedance circuits being coupled between a first voltage reference terminal and the first wire, and between a second voltage reference terminal and the second wire, respectively, the supply circuit comprising a first electronic impedance multiplying circuit including a third transistor and a second electronic impedance multiplying circuit including a fourth transistor, a main current path of the first transistor being connected in a first series arrangement with a main current path of the third transistor between the first reference voltage terminal and the first wire, and a main current path of the second transistor being connected in a second series arrangement with a main current path of the fourth transistor between the second reference voltage terminal and the second wire, said first and second series arrangements only including main electrodes of said first and third transistors, and of said second and fourth transistors, respectively.

2. A telecommunications system according to claim 1, wherein the supply circuit comprises at least a third electronic impedance multiplying circuit including a transistor in a cascode arrangement with the first electronic impedance multiplying circuit and at least a fourth electronic impedance multiplying circuit including a transistor in a cascode arrangement with the second electronic impedance multiplying circuit.

3. A telecommunications system according to claims 1, wherein the supply circuit comprises at least a reverse biased diode or a series arrangement of the reverse biased diode and a resistor coupled between a control electrode of at least one transistor of the electronic impedance circuit or the electronic impedance multiplying circuit and one of the voltage reference terminals or one of the wires, respectively.

4. A telecommunications system according to claim 3, wherein the telecommunications subscriber device comprises electronic impedance circuits and electronic impedance multiplying circuits as claimed in claim 3 symmetrically arranged with respect to the power supply and the wires.

5. A telecommunications system according to claim 1, wherein a main electrode of the first and/or the second transistor is coupled to the first voltage reference terminal and/or to the second wire, respectively, via a series arrangement of at least one forward biased diode and a resistor.

6. A telecommunications system according to claim 1, wherein a main electrode of the third and/or the fourth transistor is coupled to the first voltage reference terminal and/or to the second wire, respectively, and wherein a control electrode of the third and/or the fourth transistor is coupled to the main electrode via a series arrangement of a first resistor, a first forward biased diode, and a second forward biased diode, and a junction of the first resistor and the first diode is coupled to a third voltage reference terminal via a second resistor.

7. A line card for an automatic branch exchange comprising a supply circuit as claimed in claim 5.

8. A telecommunications system according to claim 1, wherein the first electronic impedance circuit and/or the second electronic impedance circuit comprise a control loop for controlling the voltage between main electrodes of the first and/or second transistor to a predetermined voltage value.

9. A telecommunications system according to claim 8, wherein the control loop comprises a first control transistor of which a first main electrode is coupled to one of the main electrodes of a transistor of an electronic impedance circuit, of which a control electrode is coupled to the other main electrode of the transistor of the electronic impedance circuit, and of which a second main electrode is coupled to a control electrode of a second control transistor, and wherein one of the main electrodes of the second control transistor is coupled to the one of the main electrodes of the transistor of the electronic impedance circuit and to a control electrode of the transistor of the electronic circuit, and the other one of the main electrodes of the second control transistor is coupled to a fourth voltage reference terminal.

10. A telecommunications system according to claims 1, comprising a telecommunications subscriber device coupled to the telecommunications line, the subscriber device comprising a power supply for supplying power to internal circuitry of the telecommunications subscriber device, wherein the subscriber device comprises at least one electronic impedance circuit including a transistor, the electronic impedance circuit being coupled between one of the wires and one of two power supply feeding terminals, and wherein the subscriber device further comprises at least one electronic impedance multiplying circuit including a transistor, main current paths of the transistors being coupled in a series arrangement between the at least one wire and the at least one power supply feeding terminal.

11. An automatic branch exchange comprising a supply circuit for feeding a telecommunications line comprising a first and a second wire, said supply circuit comprising a first electronic impedance circuit including a first transistor and a second electronic impedance circuit including a second transistor, the electronic impedance circuits being coupled between a first voltage reference terminal and a first wire terminal for coupling to the first wire, and between a second voltage reference terminal and a second wire terminal for coupling to the second wire, respectively, the supply circuit comprising a first electronic impedance multiplying circuit including a third transistor and a second electronic impedance multiplying circuit including a fourth transistor, a main current path of the first transistor being connected in a first series arrangement with a main current path of the third transistor between the first reference voltage terminal and the first wire terminal, and a main current path of the second transistor being connected in a second series arrangement with a main current path of the fourth transistor between the second reference voltage terminal and the second wire terminal, said first and second series arrangements only including main electrodes of said first and third transistors, and of said second and fourth transistors, respectively.

12. A supply circuit for feeding a telecommunications line comprising a first and a second wire, said supply circuit comprising a first electronic impedance circuit including a first transistor and a second electronic impedance circuit including a second transistor, the electronic impedance circuits being coupled between a first voltage reference terminal and a first wire terminal for coupling to the first wire and between a second voltage reference terminal, and a second wire terminal for coupling to the second wire, respectively, the supply circuit comprising a first electronic impedance multiplying circuit including a third transistor and a second electronic impedance multiplying circuit including a fourth transistor, a main current path of the first transistor being connected in a first series arrangement with a main current path of the third transistor between the first reference voltage terminal and the first wire terminal, and a main current path of the second transistor being connected in a second series arrangement with a main current path of the fourth transistor between the second reference voltage terminal and the second wire terminal, said first and second series arrangements only including main electrodes of said first and third transistors, and of said second and fourth transistors, respectively.

13. A telecommunications subscriber device for coupling to a telecommunications line comprising a first and a second wire, said subscriber device comprising a power supply for supplying power to internal circuitry of the telecommunications subscriber device, wherein the subscriber device comprises at least one electronic impedance circuit including a first transistor, the electronic impedance circuit being coupled between one of the wires and one of two power supply feeding terminals, and wherein the subscriber device further comprises at least one electronic impedance multiplying circuit including a second transistor, main current paths of said first and second transistors being connected in a series arrangement between the at least one wire and the at least one power supply feeding terminal, said series arrangement only including main electrodes of said first and second transistors.

* * * * *